H. A. STILSON.
TRAP.
APPLICATION FILED MAY 18, 1910.
998,047.
Patented July 18, 1911.
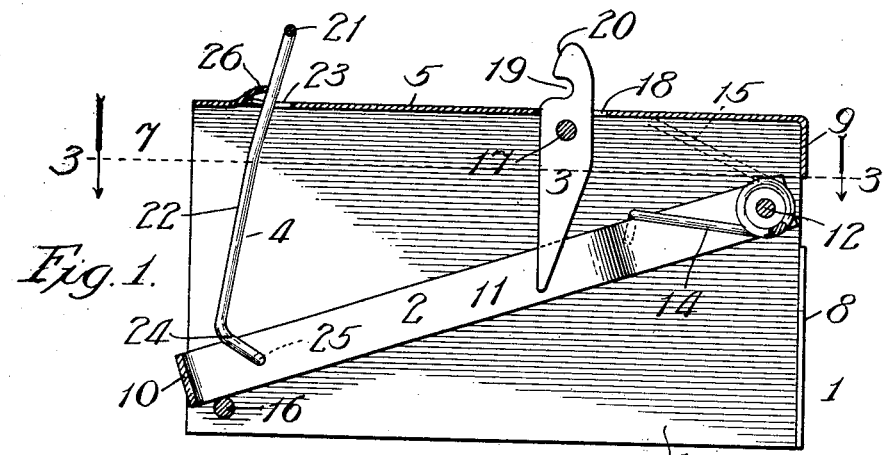
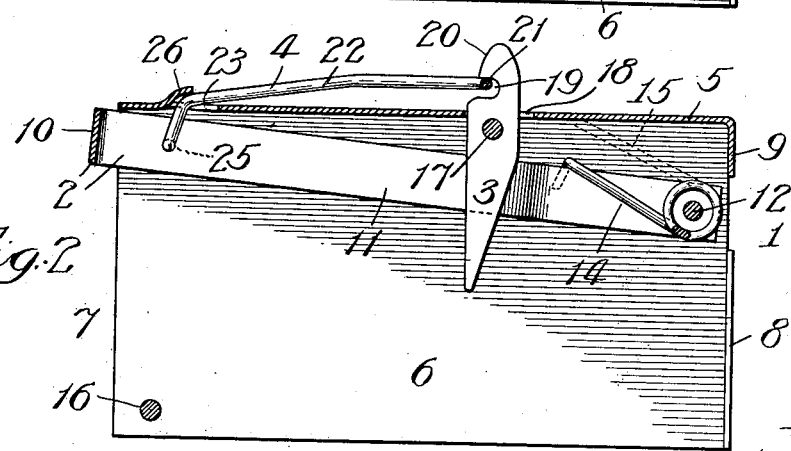
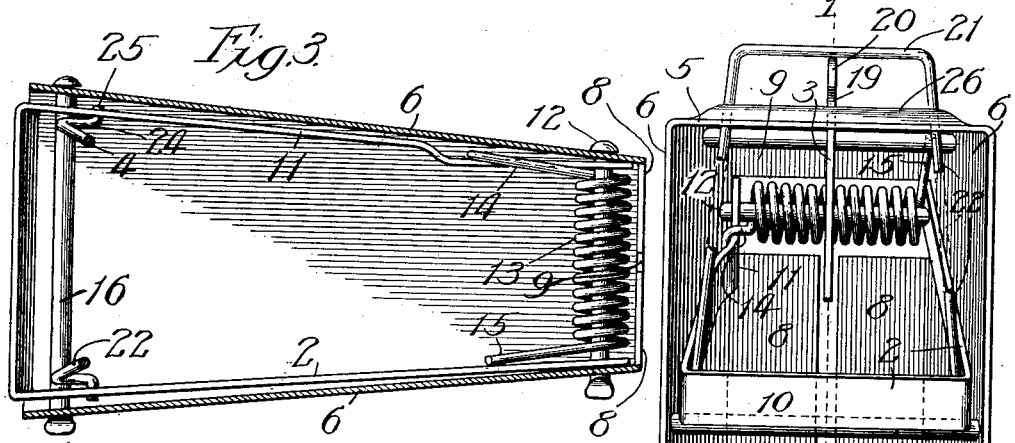

UNITED STATES PATENT OFFICE.

HERBERT A. STILSON, OF MORRISON, ILLINOIS.

TRAP.

998,047.
Specification of Letters Patent.
Patented July 18, 1911.

Application filed May 18, 1910. Serial No. 561,968.

*To all whom it may concern:*

Be it known that I, HERBERT A. STILSON, a citizen of the United States, residing at Morrison, in the county of Whiteside and State of Illinois, have invented a new and useful Improvement in Traps, of which the following is a specification.

My invention relates particularly to mouse-traps and rat-traps; and my primary object is to provide a trap of the character indicated which can be manufactured cheaply, which is effective in operation, which can be reset with facility, and in which the striker will be automatically latched or brought into restraining connection with the trip-device when moved to the set position.

The invention is illustrated in its preferred embodiment in the accompanying drawings, in which—

Figure 1 represents a longitudinal sectional view of the trap after it has been "sprung", the section taken as indicated at line 1—1 of Fig. 4; Fig. 2, a similar section, showing the trap "set"; Fig. 3, a section taken as indicated at line 3—3 of Fig. 1; and Fig. 4, a front view, with the parts in the position shown in Fig. 1, the latch-engaging bail being shown brokenly.

The invention is shown embodied in a trap, comprising a body or casing 1; a striker 2; a latch 3; and a latch-engaging bail 4, which is attached to the striker near its free end and adapted to be positively guided into locking engagement with the latch when the striker is raised to the "set" position.

The casing, or body, may be of any approved form and construction. In the form illustrated, it comprises a sheet-metal member formed to provide a top 5 and sides 6. It preferably has an open front end at 7, and a closed or obstructed rear end, the closure at the rear end being effected by bending side-extensions 8 and a top extension 9 inwardly and downwardly, respectively, so as to extend at right angles to the parts of which they form extensions.

The striker 2 comprises a U-shaped member having a web 10 and rearwardly extending arms 11, whose rear ends are mounted on a pivot 12 which is supported by the casing. Upon the pivot 12 is mounted a coil spring 13, whch has an arm 14 engaging one arm of the striker and an arm 15 engaging the casing-top. The spring is adapted to force the front end of the striker against a striker-arrester, or, stop-pin 16 which connects the lower front corners of the casing-sides.

The latch 3 is supported on a pivot-pin 17 which is supported by the casing-sides near the casing-top; and the latch, or trip-device, has a pointed lower end adapted to receive the bait and has its upper end projecting through a slot 18 in the casing-top and disposed near the center thereof. The front and rear walls of the slot are adapted to prevent the latch from swinging unduly on its pivot. Above the casing-top the latch is provided with a locking notch 19, above which the metal is beveled as indicated at 20.

The latch-engaging member, in the form shown, comprises a wire bent to U-shape, having a web 21 and arms 22. Described in the "sprung" position, the web is located above the casing-top and the arms extend downwardly through a slot 23 in the front portion of the top. The arms have near their extremities rearwardly bent portions 24 having outwardly turned extremities 25 which are pivoted in perforations with which the striker-arms are provided near the cross-member of the striker. In front of the slot 23 is a cam 26, which is formed by striking the metal at the front wall of the slot upwardly. The cam 26 is adapted to turn the latch-engaging bail 4 about its pivots 25 when the striker 2 is raised thereby to bring the member 4 to a position substantially parallel with the casing-top and cause the web 21 to automatically engage the notch 19 of the latch.

The operation is as follows: Bait is applied to the lower end of the latch 3. The striker 2 may be swung upwardly against the force of the spring 13. In this operation, the cam 26 forces the latch-engaging bail to swing to the horizontal position and thus to be automatically brought into locking-engagement with the latch. When a mouse, nibbling at the bait, swings the lower end of the latch-member 3 forwardly, the member 4 is released, allowing the striker to be thrown downwardly.

The foregoing detailed description has been given for clearness of understanding only and no undue limitation is to be understood therefrom, but the appended claims should be construed as broadly as permissible in view of the prior art.

What I regard as new and desire to secure by Letters Patent, is—

1. A trap comprising a casing, a spring-impelled striker, a latch projecting through the casing-top, a latch-engaging member connected with said striker and extending through the casing-top, and means for automatically guiding said latch-engaging member into locking engagement with the upper portion of said latch when the striker is moved to the set position.

2. A trap comprising a casing, a U-shaped spring-impelled striker pivoted therein, a U-shaped latch-engaging member pivotally connected with said striker near its free end and extending above the casing, a latch having its upper end projecting above the casing, and means for automatically guiding said latch-engaging member into locking engagement with said latch when the striker is raised.

3. A trap comprising a casing, a U-shaped striker having its arms pivoted to the casing, a latch-member pivoted in the upper portion of the casing and projecting above the casing-top, a U-shaped latch-engaging member having its arms pivoted to the arms of the striker near the cross-member of the striker, said latch-engaging member projecting above the casing, whereby its cross-member may be brought into locking engagement with said latch when the striker is moved to the set position, and means for automatically guiding said latch-engaging member into such locking engagement.

4. A trap comprising a casing having sides and a top provided near its front end with a cam, a striker pivoted near the rear end of the casing, a latch having a notched end extending above the casing, and an automatically-set latch-engaging member having bent arms adapted to engage said cam and a web adapted to engage said latch.

HERBERT A. STILSON.

In presence of—
J. G. ANDERSON,
R. A. SCHAEFER.

---

Copies of this patent may be obtained for five cents each, by addressing the "Commissioner of Patents, Washington, D. C."